June 18, 1968  G. LAUBMEYER ET AL  3,388,850

WIRE SOLDER

Filed Feb. 8, 1967  2 Sheets-Sheet 1

United States Patent Office 3,388,850
Patented June 18, 1968

3,388,850
WIRE SOLDER
Gunther Laubmeyer and Marius Smits, both of 73 Bahnhofstrasse, Arolsen, Waldeck, Germany
Continuation-in-part of application Ser. No. 415,727, Dec. 3, 1964. This application Feb. 8, 1967, Ser. No. 614,668
Claims priority, application Germany, Dec. 4, 1963, L 46,508; Aug. 8, 1964, L 48,501; Nov. 10, 1964, L 49,249
9 Claims. (Cl. 228—56)

ABSTRACT OF THE DISCLOSURE

A flux containing solder wire contains per meter at least 500 slots which have a conical form to hold fluxing agent securely when the wire is wound up or bent.

This application is a continuation-in-part of our application Ser. No. 415,727, filed Dec. 3, 1964.

This invention relates to a flux-filled wire solder for soft soldering.

Solder metal is generally supplied to the soldering point as a solder wire or rod. A great number of suggestions have been made for a suitable combination of solder and flux so as to ensure the presence of flux at each soldering operation. A conventional form of such combination is represented by the cored solders where a solder wire is provided with one or more axial flux-containing cavities. As the cored solder melts at each soldering operation, a proportional amount of fluxing agent contacts automatically the soldering point.

Though said type of cored solders is predominantly used at present, it is not yet an ideal solution of the problem. It would be desirable to have the fluxing agent reach the surfaces to be soldered first, so to cover, reduce and clean the same and to ensure that subsequently the melting solder contacts a clean surface.

Various proposals have been made to accomplish such soldering process. For instance, longitudinal or spiral grooves have been provided on the surface of self-fluxing solder wires or rods, which are filled with flux or through which material from a flux core could flow out. In such an arrangement, the fluxing agent is not firmly enough embedded in the solder, and it is impossible to proportion the outflowing fluxing agent properly for each soldering operation. The same drawback is observed in solders which are completely coated with a fluxing agent. Such solders are sticky and difficult to handle, and the coating of the fluxing agent breaks off when the solder wire is wound up or used.

In order to avoid said disadvantages, it has also been proposed to provide in the solder sinuous or flat spherical recesses and to fill such recesses either with a liquid flux shortly before the use of the solder, or already during the preparation with a fluxing agent which is solid at the ambient temperature and seals the recesses. However, also this procedure could not solve the problem to supply a proper amount of the fluxing agent to each soldering operation and to prevent loss of fluxing agent as a result of the unavoidable bending stresses to which a solder wire is necessarily subjected.

It is, therefore, a principal object of the invention to provide a wire solder which contains the fluxing agent in such a manner as to avoid the recited drawbacks.

Other objects and advantages will be apparent from a consideration of the specification and claims.

In accordance with the invention, a wire solder is provided for 1 m. each of its length with at least 500 or more equidistant slits whose longitudinal center planes lie in the longitudinal direction of the wire and which flare conically outwardly towards the surface so as to release a proper amount of fluxing agent at each soldering operation. The angle of divergence of the conical expansion in the longitudinal direction of the wire must be larger than 30° and generally should be in the range of 35 to 60, preferably 40 to 55°. Also the lateral walls lying at both sides of said conically flaring walls of the slits may preferably have a slight conicity whose angle of divergence must be, however, much smaller and is in the range of 5 to 15, preferably 10°.

The form of the recess according to the invention provides an aperture extending in the direction of the wire axis, whereby the length of said recess or slit is of the order of magnitude of its depth, or may be smaller. The width of the recess is always smaller than its length. The proportion of the length of the recess to its width should be generally not less than about 1.5:1, but in some cases it may be increased to 2:1 or more.

The depth of the slits depends on whether or not the solder wire has a core. In cored solders, the slits must, of course, extend from the core to the surface. In solid solder wires, the depth of the slits should be at least 10, preferably 10 to 25 percent of the wire diameter.

Preferably, the recesses are arranged at two, preferably opposite, sides of the wire. In this case, the recesses of the one side are preferably staggered with respect to those of the other side to avoid unnecessary weakening of the wire diameter. Additional rows of recesses can be provided at other sides of the wire, e.g., an additional pair of opposite rows at a right angle of the first pair. This arrangement is recommended for manufacturing reasons. The rows of recesses need not be parallel to the longitudinal axis of the wire but may be arranged, for example, helicoidally or in any angular relationship.

This inventive concept may be realized in different ways. In one embodiment of the invention, the fluxing agent is arranged in an axial cavity inside the wire and the wire is provided with the required number of fine ducts leading from the fluxing core through the sheath of the metal solder to the outside; said ducts present multiple exits to the fluxing agent either over the entire surface of the solder wire or in one or more preferred directions and ensure a controlled outflow of the fluxing agent. Thereby, the recesses can be filled with the fluxing agent already in the manufacture of the wire, e.g., from the core. In another embodiment of the invention, a massive coreless solder wire is provided with the required number of slits which are filled with the fluxing agent; the flux flows out on heating before the solder itself melts.

The novel solder wire ensures that the solidified fluxing agent, even on repeated bending of the wire, does not, or only to a very minor extent, fall out of the recesses in spit of their outwardly flaring form. This result is due to the slitlike form of the recesses and their opening and to their orientation in the longitudinal direction of the wire. On bending, e.g. on winding up the wire, said openings are deformed in such a way as to counteract any substantial fallout of the flux particles though at room temperature they are brittle and rather fragile.

On heating the wire solder, the fluxing agent, which, though solid at normal temperature, has a melting point far below the melting point of the metal sheath, will melt first and flow out through the slot or slots adjacent the melting wire end. In this way, the flux will cover, reduce, and clean the surfaces to be soldered before the solder is melted, and the molten solder can now alloy itself to the cleaned metal surfaces with formation of a properly soldered joint. Particularly in cored wires, the outwardly conically flaring form of the recesses causes that the pressure of the heated and melting fluxing agent effects a diffusor-like outflow thereof through the enlarging cross-sections of the recesses so as to avoid any sputtering of the outflowing flux.

All the recited advantages of our novel solder wire contribute to the result that increased soldering speeds are obtained even with fluxing agents which are completely free of corrosive activators. In manual operation, the soldering speed can be increased by almost 20 percent.

In a plant employing 1200 solderesses, the same work load can be performed with only 1000 to 1100 workers when the conventional cored solder is replaced by our novel cored solder, using the same fluxing agent.

The invention will now be described in more detail with reference to the accompanying drawings, which show, by way of example, various embodiments of the novel solder, and apparatus for making such solder wire.

Figure 1:
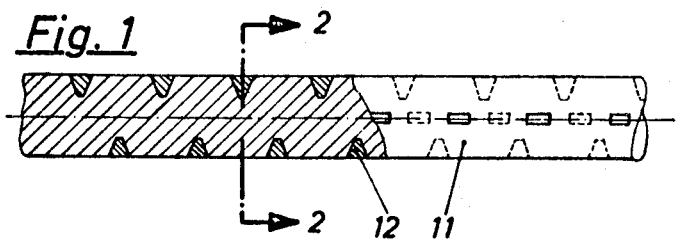
FIG. 1 is a top plan view, partially in section of a coreless wire solder according to the invention.
Figure 2:
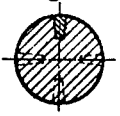
FIG. 2 is a cross-sectional view of the solder wire of FIG. 1, taken along line 2—2 of FIG. 1.
Figure 3:
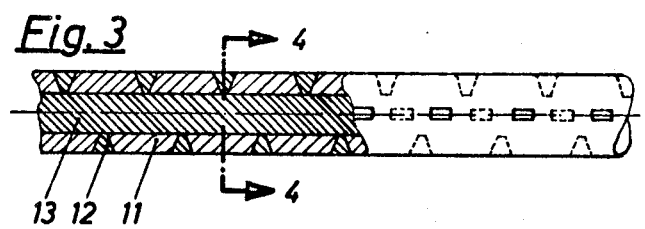
FIG. 3 is a view like FIG. 1 of a cored wire solder.
Figure 4:
FIG. 4 is a cross-sectional view of the solder wire of FIG. 3, taken along line 4—4 of FIG. 3.

Referring now to the drawings and particularly to FIGS. 1–4, the numeral 11 designates the wire solder with conical recesses 12 which in the solder of FIGS. 3 and 4 extend to the flux core 13. As in the embodiment of FIGS. 1 and 2 the axial cavity 13 is lacking the capacity of the recesses 12 for the flux must be increased. This can be done by increasing the number of the recesses and/or enlarging their diameter and/or depth. Nonetheless, the amount of fluxing agent per unit of length of the solder wire may be reduced to 1 percent and even to 0.1 percent by weight of the metal. In this way, the outflow of excess rosin at the points of application can be avoided, which is of particular importance for the soldering of microcircuits.

In the manufacture of wires according to FIGS. 1 and 2 the fluxing agent is not exposed to temperatures of 120 to 140° C. which are unavoidable in the manufacture of the cored wire solders of FIGS. 3 and 4. Therefore, activators like hydrazine compounds may be incorporated in the fluxing agent which at said higher temperatures could not be used. In addition, soldering wires according to FIGS. 1 and 2 have a higher mechanical strength than the perforated wire solders of FIGS. 3 and 4. This is advantageous for machine soldering where the soldering wire is automatically supplied. Furthermore, the manufacture of such soldering wires is much simpler and cheaper when they are not made as hollow tubular solders.

Number, shape and direction of the recesses 12 must be suitably adjusted for accomplishing the best effects. The number of the channels should be at least 500 per meter of wire, when equally spaced. According to a preferred embodiment of the invention, two to four such groups, distributed over the periphery are provided. Depending on the diameter of the wire, 2000 to 4000 and more recesses can be provided. In this way, a sufficient amount of fluxing agent can be applied to each soldering point prior to the soldering operation. Rows of slits made at different areas of the wire periphery can be arranged in staggered relationship to each other. Generally, a length of wire solder required for a soldering operation should contain at least two recesses distributed over the periphery, which may, for instance, be at opposite sides of the wire or staggered in the longitudinal direction of the wire so as to have readily disposable for every soldering operation at least one recess for an optimum amount of fluxing agent.

Figure 7:
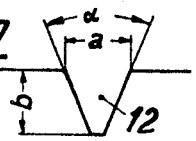
FIG. 7 is a longitudinal section.
Figure 9:
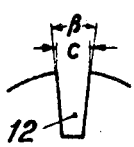
FIG. 9 is a cross-sectional view, all on an enlarged scale, of a recess in accordance with the invention.
Figure 8:
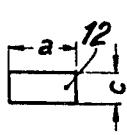
FIG. 8 is a plan view.

The critical shape of the recesses is illustrated, by way of example, in FIGS. 7 to 9. Said shape must ensure, on the one hand, the required release of the liquefied fluxing agent, also against capillary forces. On the other hand, the preparation of the solder wire and filling of the recesses must be possible without undue difficulties. Particularly, it must be ensured that on bending, e.g., on winding up or during use of the wire, substantially no fluxing agent, which at room temperature is frequently quite brittle, does not fall out of the recesses. Finally, the fluxing agent, also if placed in a concentric cavity in the form of a core (FIGS. 3 and 4), should be dispensed evenly and without sputtering as soon as it melts below the soldering temperature.

To accomplish all said objects, the recesses and their outlet openings must have a cross section which conically flares outwardly at least at the two opposite sides lying in the longitudinal direction of the wire. The angle of divergence $\alpha$ of said sides must be at least 30°, preferably 35 to 60° and should best be between 40 and 45° (FIG. 7). The depth $b$ of the slits should be about equal the length $a$ of the outlet opening in the longitudinal direction, preferably even larger. The width $c$ of the outlet opening transversely of the longitudinal direction of the wire is only a fraction, e.g., about half of the depth or length of the slit openings (FIG. 8). The depth of the slits is at least 10 percent and, in many cases, may reach 25 percent of the wire diameter. In the embodiment of FIGS. 3 and 4, the slits must be of course, deep enough to reach the core.

Also the opposite walls of the recesses which extend in the transverse direction of the wire, may be slightly conical to each other and e.g., form an angle $\beta$ about 10° (FIG. 9).

In the embodiment of the invention illustrated by FIGS. 3 and 4, the desired effect may be sped up by filling the channels with fluxing agent from the core 13 already at, or immediately following, the manufacture of the soldering wire by heating at a temperature sufficient to melt the fluxing agent but below the melting point of the solder. We prefer to cool the thus treated wire immediately after the heat treatment to ensure that the fluxing agent solidifies as soon as it has filled the channels and before a significant amount thereof can emerge at the surface of the wire.

In all embodiments of the invention, the outlet openings of the recesses may be coated with a lacquer which melts or becomes detached at the melting point of the fluxing agent.

The filling of the recesses 12 of the solder wire with fluxing agent may be assisted as follows: After the recesses have been made, the are filled with a liquid which has good wetting properties and whose evaporation point lies above room temperature and at or below the melting point of the fluxing agent. If the thus treated wire is passed through a bath of the molten fluxing agent, said liquid evaporates at once, and the produced void is filled quickly and evenly by the fluxing agent. The excess of fluxing agent adhered to the periphery of the wire is removed by a stripping means, and the wire is then cooled immediately.

Figure 5:
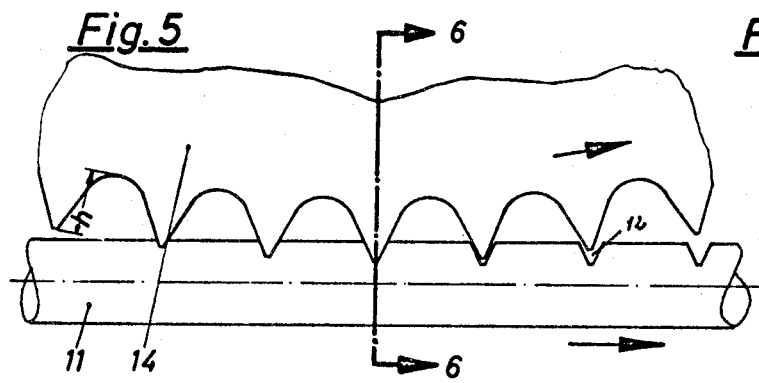
FIG. 5 shows the preparation of slit-formed recesses in a solder wire by means of toothed disc.
Figure 6:
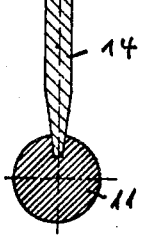
FIG. 6 is a cross-section taken along line 6—6 of FIG. 5.

The recesses may be produced, as shown diagrammatically in FIG. 5, by means of circular steel discs which are equipped at their periphery with polished teeth. Shape and spacing of the teeth corresponds to the shape and spacing of the slits 12. The diameter of the toothed discs is preferably so chosen that always at least 4, better 5 teeth engage the wire at the same time for producing the desired recesses whose form then corresponds substantially exactly to the form of the teeth. Preferably, the wire can be processed simultaneously with pairs of discs facing each other. If two such pairs are arranged perpendicularly to each other, four rows of recesses can be produced in a single operation.

Figure 10:
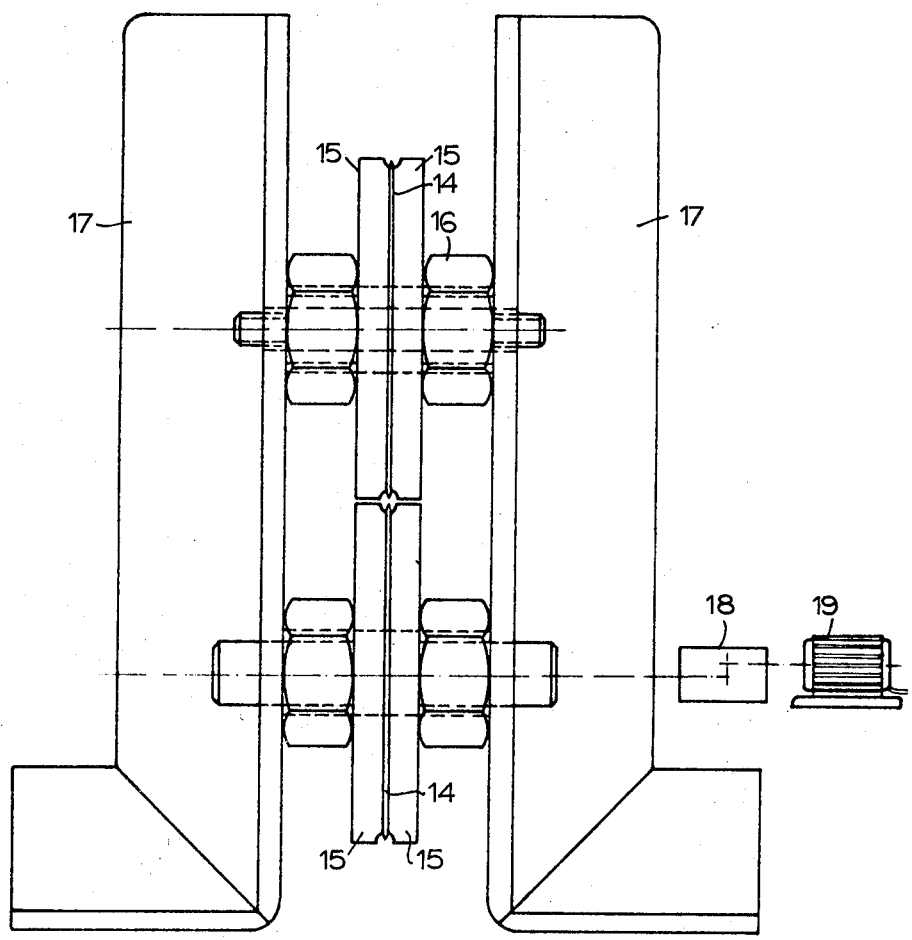
FIG. 10 shows diagrammatically a device suitable to cut conical slit-shaped recesses into a wire solder.
Figure 11:
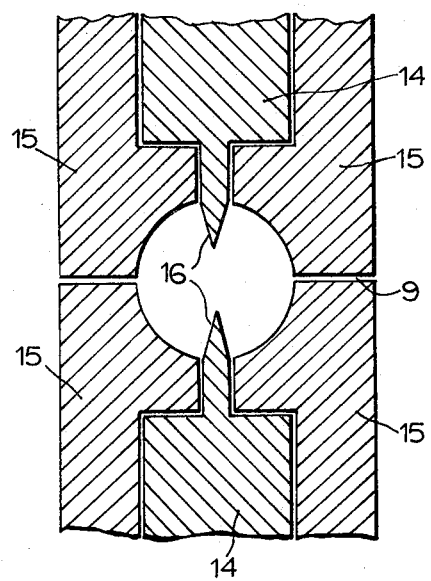
FIG. 11 is a sectional view of the machine of FIG. 10.

A suitable device for the punching of the recesses is shown in FIGS. 10 and 11. There, two toothed discs 14 engaging the wire 11 are secured between the half sections of rollers 15 which are supported in brackets 17 and pressed together by nuts 16. Even when two pairs of rollers are used, it is mostly sufficient to drive only one of the rollers 15 by means of a motor 19 over gear 18; the other roller is then carried along by means of the teeth 16 of the corresponding disc 14 engaging the wire, and the wire itself may also drive a second pair of rollers arranged perpendicularly to the first pair (not shown). Such two roller pairs are employed when four rows of slits are to be produced in the wire.

The teeth 17 of the steel discs 14 project into the groove enclosed by the rollers so far as required by the depth of the recesses to be cut into the solder wire advanced through said groove. The teeth 16 are preferably polished to delay or prevent smearing with the soldering alloy.

By way of illustration, the production of a solder wire according to the invention in the apparatus described hereinabove will be given in the following example.

EXAMPLE

A solid solder wire of 2 mm. diameter was drawn through a tool of the type shown in FIGS. 10 and 11. The discs 14, measured from the point of a tooth 16 to the point of the opposite tooth, had a diameter of 63.5 mm. The teeth, measured at their points, were spaced 2 mm. from each other. The height of the teeth was 1.0 mm., the angle $\alpha$ is 50° and the angle $\beta$ is 10°. At a thickness of the discs of 0.5 mm., the thickness of the points of the teeth was, therefore, about 0.2 mm. The two discs 14 and 14' were so spaced that the teeth entered the wire to a maximum depth of 0.5 mm. and that, according to their diameter, just 5 teeth could simultaneously engage the wire. In this way, either side of the wire received 500 slits per 1 m. length, whereby said slits had the form shown in FIGS. 7–9 ($\alpha$=50°; $\beta$=10°; $a$=0.55 mm.; $b$=0.5 mm., and $c$=0.28 mm.).

Subsequently, the wire was passed through a bath of methanol so as to fill the slits therewith. Then, the wire was passed through a bath of the molten fluxing agent having a temperature above the boiling point of the methanol. In this way, the methanol evaporated and the fluxing agent entered and filled the slits. Subsequently, the wire was drawn through suitable scraping means to remove excess fluxing agent, and finally, in order to protect the fluxing agent against moisture, through a device applying a rosin solution in a suitable plasticizer as a coating or lacquer whose excess was again removed by a doctor or other scraping means.

Any other suitable coating or lacquer can be employed provided it has a melting point considerably below the melting point of the solder to ensure that the fluxing agent will flow out of the slits at the right time during the heating period starting the soldering operation. Such a coating, is, of course, only useful if a fluxing agent is used which can be affected by the oxygen or humidity of the atmosphere.

We claim:

1. A flux-containing solder wire containing per 1 meter of its length at least 500 substantially evenly spaced slots extending in the longitudinal direction of the wire, said slots extending inwardly for at least $\frac{1}{10}$ of the wire diameter and their opposing walls extending in said longitudinal direction of the wire flaring outwardly at an angle of about 30 to 60°, said arrangement and shape of the slots ensuring substantially retention therein of flux even on repeated bending of the unheated wire.

2. A solder wire as claimed in claim 1 wherein the length of the openings of the slots is at least 1.5 times their width.

3. A solder wire as claimed in claim 2 wherein the walls of said slots opposing each other transversely of the longitudinal direction of the wire flare outwardly at an angle of about 5 to 15°.

4. A solder wire as claimed in claim 1 wherein said slots extend inwardly to a depth of 10 to 25 percent of the diameter of the wire.

5. A solder wire as claimed in claim 1 wherein the depth of said slots is at least equal to the length of the slots.

6. A solder wire as claimed in claim 1 containing a core of fluxing agent, said slots extending inwardly into said core.

7. A solder wire as claimed in claim 1 containing a plurality of parallel rows of said slots.

8. A solder wire as claimed in claim 7 wherein the slots of one of said rows are staggered with relation to the slots of the neighboring rows.

9. A solder wire as claimed in claim 1 wherein the volume and spacing of said slots is sufficient to receive per unit of length of the wire the fluxing agent in an amount of 0.1 to 1 percent by weight, calculated on the weight of the metal of said unit of length.

References Cited

FOREIGN PATENTS 562,812  9/1958  Canada.
525,583  8/1940  Great Britain.
495,576  9/1950  France.

RICHARD H. EANES, Jr., *Primary Examiner.*

JOHN P. CAMPBELL, *Examiner.*

M. L. PAIGUS, *Assistant Examiner.*